United States Patent

[11] 3,575,362

[72] Inventors William M. Hammond
Maitland;
Willis G. Martin, Orlando, Fla.
[21] Appl. No. 764,704
[22] Filed Oct. 3, 1968
[45] Patented Apr. 20, 1971
[73] Assignee The United States of America as represented by the Secretary of the Navy

[54] ADAPTIVE MISSILE CONTROL SYSTEM INCORPORATING A SUPERVISORY LOOP
5 Claims, 2 Drawing Figs.
[52] U.S. Cl. .................................................... 244/3.2, 244/77, 318/20.05
[51] Int. Cl. ....................................................... G05b 13/00, F42b 15/02, F41g 7/00
[50] Field of Search ............................................. 244/3.2, 77; 318/489, 20.05

[56] References Cited
UNITED STATES PATENTS
3,109,970 11/1963 Smyth ........................... 318/20.05
3,216,676 11/1965 Brown et al. ................... 318/20.05
3,225,179 12/1965 Chestnut et al. ............... 244/77X Primary Examiner—Benjamin A. Borchelt
Assistant Examiner—Thomas H. Webb
Attorneys—Edgar J. Brower and H. H. Losche ABSTRACT: An adaptive missile control system having a supervisory loop operative during high speed and low altitude of the missile in which high dynamic pressures are effective on the control surfaces requiring small deflection actuation of the control surfaces which supervisory loop is inoperative during low speed and high altitudes of the missile to provide adaptive control to the control surfaces for equally effective missile guidance control in accordance with the speed of the missile and the density of the air through which it travels.

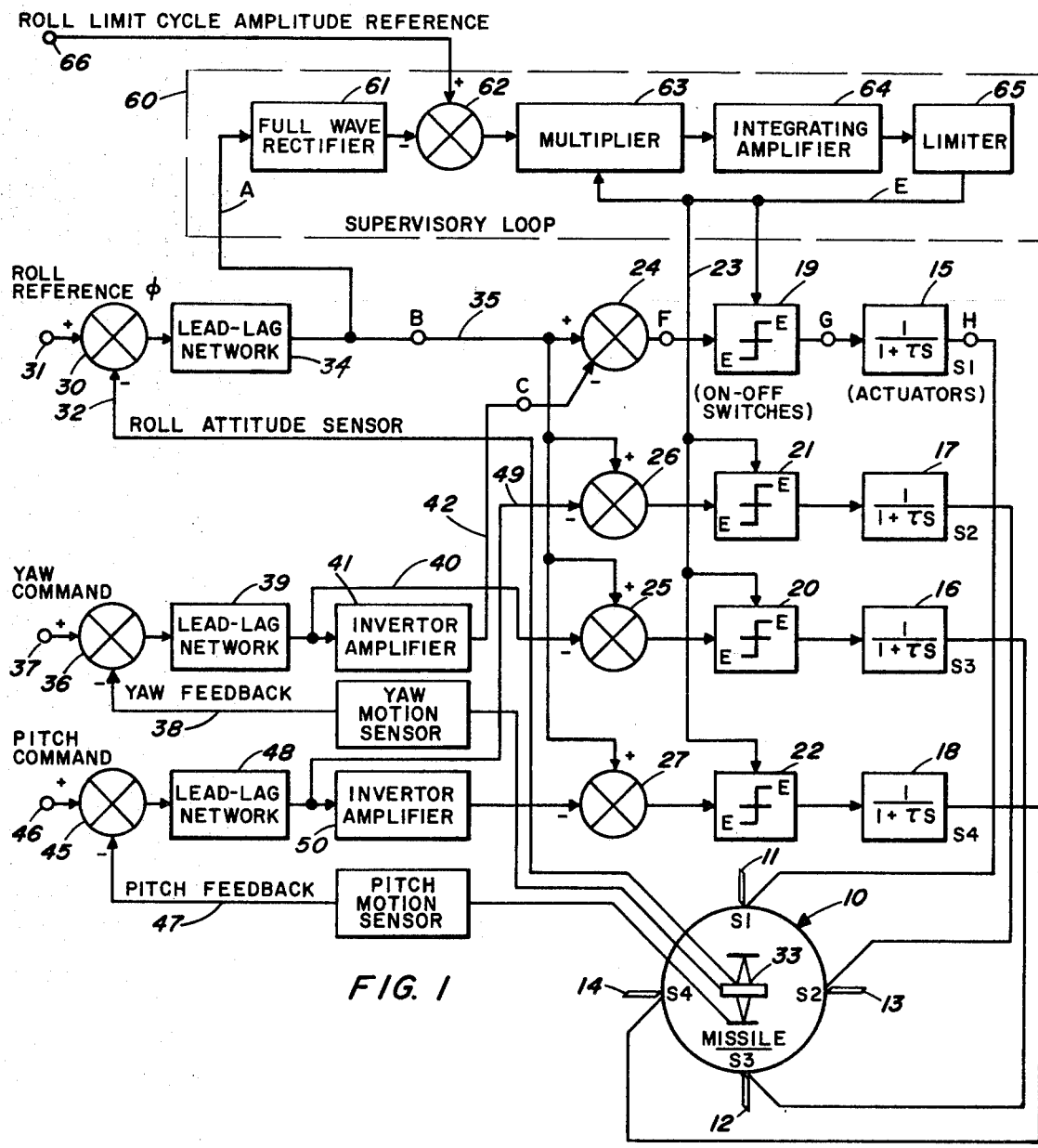
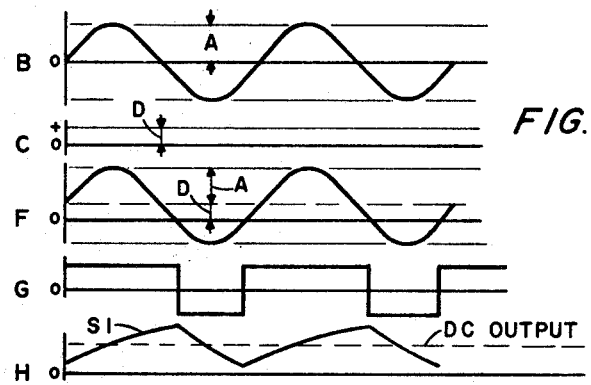
FIG. 1
FIG. 2
INVENTORS
WILLIAM M. HAMMOND
WILLIS G. MARTIN
BY H. H. Losche
ATTORNEY 3,575,362

ADAPTIVE MISSILE CONTROL SYSTEM INCORPORATING A SUPERVISORY LOOP

BACKGROUND OF THE INVENTION

This invention relates to missile control systems and more particularly to adaptive missile control systems having incorporated therein a supervisory loop which becomes operative to effect the same degree of missile guidance during slow speeds and low air density as during high speed and high air density.

Many modern missiles have large variations in velocity and altitude. This produces large variations in dynamic pressure $q$ which is the parameter that primarily affects missile sensitivity and thus controls loop gain. Some means for varying control loop characteristics (usually gain) must be provided to produce satisfactory missile control response and stability throughout the range. Several techniques are available to provide the necessary control loop adjustments. Some of the more recent techniques involve the use of adaptive control systems. Model reference systems have become fairly familiar where the control loop response is made to match a model by varying one or more parameters in the control loop. Passive adaptive techniques which use the effect of nonlinear elements in control loops to produce the adaptive nature are also used. However, when the range is very large, all of the techniques mentioned above have a fundamental problem. In both the model reference and the passive adaptive methods which use multipliers for gain control, the dynamic range (ratio of the maximum motion to the minimum resolution) of the components between the gain changer and the aerodynamic surfaces must be very large. Usually the most critical element is the control vane or surface actuator. To have a 1 percent resolution the system must be able to detect and respond to changes in signals that are as small as 0.01 times the maximum effort for that flight condition. Where there is a sensitivity range of 25 to 1 and when the missile is least sensitive, 25° of actuator vane motion may be required to produce a certain response or maneuver and when the missile is most sensitive, only one degree of actuator vane motion may be required to produce the same response or maneuver. If 1 percent resolution is required, the actuators must provide control motions of 0.01° when the maximum effort is only 1°. Since the maximum angle of 25° is required for the maximum maneuver at the least sensitive flight condition, the dynamic range is maximum motion divided by the minimum control motion, or 2500 to 1. The signal levels ahead of the gain changer remain constant and must merely provide the 1 percent resolution, or in other words, a 100 to 1 dynamic range. For the nonlinear passive adaptive technique the signal levels behind the nonlinear on-off elements are constant while the data processing circuits and angle sensors in the roll channel ahead of the nonlinear elements have the same 2500 to 1 dynamic range discussed above.

SUMMARY OF THE INVENTION

The invention disclosed herein is designed to alleviate the dynamic range requirements by combining the nonlinear passive adaptive technique with the supervisory loop technique. The supervisory loop is used over a portion of the dynamic pressure $q$ range and is then limited so that it cannot alter loop gain further. The nonlinear passive adaptive feature is then used over the rest of the $q$ range. Again, if a $q$ range of 25 to 1 is considered but the supervisory loop can only change the gain 5 to 1 and the rest of the gain change (5 to 1) is provided by the nonlinear passive adaptive technique, the dynamic range of the actuators and the roll signal processing can be apportioned in any ratio desired. It is an object, therefore, to provide an adaptive missile guidance system with a supervisory loop to produce variable missile control surface actuator motion during high missile speeds or low altitude and to produce nonlinear adaptive control during low missile speeds and at high altitude. This is the preferred arrangement of supervisory loop and passive adaptive regions of operation even though the order may be reversed for some applications.

BRIEF DESCRIPTION OF THE DRAWINGS

These and other objects and the attendant advantages, features, and uses will become more apparent to those skilled in the art as a more detailed description proceeds when considered along with the accompanying drawing in which:

FIG. 1 is a circuit schematic block diagram of the invention, and

FIG. 2 illustrates several waveforms which appear at the identified points in FIG. 1.

DESCRIPTION OF THE PREFERRED EMBODIMENT

Referring more particularly to FIG. 1, with occasional reference to FIG. 2, there is illustrated herein a missile 10 having yaw control surfaces 11 and 12 and pitch control surfaces 13 and 14. The yaw control surfaces 11 and 12 are powered by actuators herein shown removed from the missile as 15, 16, 17, and 18, respectively, with couplings therefor shown by lines to the respective elements. The electric power for the several actuators is supplied from on-off switches 19, 20, 21, and 22 coupled by conductor means, respectively, to the actuators 15 through 18. The on-off switches 19 through 22 are supplied a supply voltage E over the conductor means 23 in parallel to the four on-off switches. Each on-off switch also has a control input coupled from summing circuits 24, 25, 26, and 27, respectively.

A roll channel, a yaw channel, and a pitch channel supply two input voltages to each of the summing circuits 24 through 27. The roll channel consists of a summing network 30 to which is applied a roll reference input from a tap 31 and a second input to the summing network 30 is from a roll attitude sensor conductor means 32 originating in a gyroscopic device 33 carried in the missile. The roll attitude sensor device is a pickoff from the roll axis gimbal of the gyroscope 33, to provide an electrical signal proportional to the roll attitude of the missile. The output of the summing network 30 is coupled directly through a lead-lag network 34 for providing the proper phasing of the roll signal for stability of the roll loop and this output is conducted by way of the conductor means 35 in common as one input to all of the summing circuits 24 through 27.

The yaw channel consists of a summing network 36 receiving a yaw command signal from the tap 37 as one input thereto and a yaw feedback signal over the conductor means 38 from a yaw attitude or acceleration sensor depending on the desired control parameter. For the purposes of discussion the yaw feedback signal will be proportional to missile yaw attitude and will be derived from the yaw gimbal at the gyroscopic device 33 carried in the missile. The sum or difference of the two input signals from the summing circuit 36 is conducted through a lead-lag network 39 over conductor means 40 as the second input to the summing network 25. The output of the lead-lag network 39 is also conducted through an inverter amplifier 41 over conductor means 42 as the second input to the summing network 24.

The pitch channel consists of a summing network 45 having as one input a pitch command signal from the input terminal 46 and a second input consisting of a pitch signal feedback on the conductor means 47 which like the yaw channel carries signals proportional to the control parameter. Also, like the yaw channel for discussion purposes the feedback signal will be proportional to the missile pitch attitude which is derived from the pitch gimbal of the gyroscopic device 33 carried in the missile. The sum or difference output of the summing network 45 is coupled through a lead-lag network 48 over a conductor means 49 as the second input to the summing network 26. The lead-lag network 48 output is coupled also through an inverter amplifier 50 and applied as the second input to the summing network 27.

The circuit thus far described for FIG. 1 embodies a passive adaptive control system for a missile to transmit command signals to the missile for the guidance thereof in roll, pitch, and yaw. The roll reference signal applied to terminal 31 and the yaw and pitch command signals applied to terminals 37 and 46 are of the usual character direct current (DC) command signals which are summed to find the sum or difference between their respective roll attitude signal over conductor 32, yaw feedback signals over conductor 38, and pitch feedback signals over conductor 47, to produce sum and difference output signals therefrom which are operated upon by the lead-lag networks 34, 39, and 48, respectively, to provide proper signal phasing for proper loop operation. Due to the nonlinear action of the on-off switches 19, 20, 21, and 22, the roll channel operates in a stable limit cycle which causes the missile to oscillate in roll attitude in a sinusoidal manner. The amplitude of the roll attitude sinusoidal oscillation is proportional predominantly to the dynamic pressure experienced by the missile and the amplitude of the supply voltage E. This characteristic is familiar to those skilled in the art of nonlinear servomechanisms. This missile roll oscillation produces sinusoidal signals on the conducting means 32 and at point B on the FIG. 1. The waveform is shown on the B curve of FIG. 2. The roll reference signal 31 is representative of the desired average value of the limit cycle oscillation and is conventionally set at zero. Any yaw command signal at terminal 37 will be added to or subtracted from the yaw feedback signal coming by way of 38 to produce an output signal through the lead-lag network 39 to produce a very low frequency signal compared to the roll limit cycle frequency on the outputs 40 and 42 to the summing networks 25 and 24, respectively. This low frequency signal will appear at the tap C which corresponds to the waveform C in FIG. 2 shown as signal of amplitude D. The signal C is the error signal which is the signal difference between the signal command at terminal 37 and the signal feedback on the conductor 38 to the summing network 36 after being operated on by network 39 and signal C may be positive or negative. Since this signal C is of such low frequency and low amplitude D it is illustrated herein as being a direct current (DC) signal applied as the second inputs to summing circuits 24 and 25. Signal C illustrated by line C in FIG. 2 and terminal C in FIG. 1 will produce an output on the summing network 24 as a sine wave shown by waveform F in FIG. 2 biased by the amplitude D of the signal C. This signal impressed on the on-off switch 19 will produce a switch output as shown at terminal G by the waveform G in FIG. 2. The actuator 15 will be actuated at point H as shown by the waveform H in FIG. 2 providing an average DC output as shown in FIG. 2 to actuate the control surfaces 11 and 12. The signal G will change to equalize the positive and negative portions as the error voltage zeros. The inverter 41 inverts one of the output signals in the yaw command channel to one of the summing networks, herein shown to be the summing network 24, and is for the purpose of reversing the drive on the control surface 11 to drive it in the same angular direction as control surface 12 since the actuators are operating upside down from each other. For the purpose of simplicity let it be assumed that actuator S1 actuates control surface 11 and actuator S3 controls the control surface 12. In like manner the actuator 17 may be identified as S2 being the actuator for control surface 13 and the actuator 18 is identified as S4 actuating the control surface 14 in the missile. In this manner S1 and S3 are yaw actuators of control surfaces 11 and 12 while S2 and S4 are pitch actuators for control surfaces 13 and 14. The inverting amplifier 50 is used in the pitch channel to reverse the signal to one of the actuators herein by the actuator S4 so that the pitch actuators S2 and S4 will rotate the control surfaces 13 and 14 in the same angular direction. The positive and negative symbols appearing at the inputs to the several summing networks are commonly used to describe the algebraic summation of the feedback or inputs. The pitch and yaw control surfaces of the missile are controlled by the pitch and yaw command signals applied to terminals 46 and 37, as well understood by those skilled in the art and as more fully and completely described in such text as "Servomechanisms And Regulating System Design," Volume 1, by Harold Chestnut and Robert Mayer, Second Edition, published by John Wiley and Sons, Inc., New York, 1959, and in the text "Servomechanism Practice," by William Ahrendt, published by the McGraw-Hill Company, Inc., 1954. An adaptive control system is also shown and described in the U. S. Pat. No. 3,241,027 of Thomas B. Albright, issued Mar. 15, 1966.

In the prior known adaptive loops the supply voltage E over the conductor 23 to the on-off switches 19 through 22 is ordinarily a fixed amplitude voltage which will passively correct the pitch and yaw control systems for changes in dynamic pressure, $q$, on the control surfaces of the missile; however, large variations in roll limit cycle amplitude result. In this invention a supervisory loop shown enclosed within the dashed lines 60 consists of a full wave rectifier 61, a summing network 62, a multiplier network 63, an integrating amplifier 64, and a limiter 65, in that order, from an input 35 to the full wave rectifier 61 to the output 23 from the limiter 65. The input to the full wave rectifier 61 is taken from the roll channel lead-lag network output 35 which is the waveform as shown in B of FIG. 2 having an amplitude A. This waveform B is rectified in 61 and applied to the summing network 62 to compare with a roll limit cycle amplitude reference signal applied to terminal 66. The signal at terminal 66 is chosen to produce the desired maximum roll limit cycle amplitude. As the missile 10 is traveling at high speed or at low altitude where the air density is high, the effectiveness of the control surfaces 11 through 14 is very high normally causing very large roll limit cycle amplitude which is sensed by the pickoff means in the gyroscope 33. These large roll limit cycle signals will tend to increase the amplitude A of the signal B shown by waveform B in FIG. 2 to an amount exceeding the roll limit cycle amplitude reference signal at 66 to decrease the output voltage E to the switching circuits 19 through 22. The lower amplitude supply voltage E to the switching circuits causes smaller supply voltages to be applied to the actuators 15 through 18 producing smaller angular motions of the control surfaces 11 through 14 in accordance with any command signals to make the missile 10 of lesser response in all three axes. This supervisory loop 60 operates to compare the roll signal, B, to the reference signal from the tap 66 to vary the supply voltage E to maintain the amplitude A of the signal B in FIG. 2 constant. This may be stated in the following where $K$ represents the DC gain of the on-off switches when the DC signal is summed with a sinusoidal signal of amplitude A.

$$K \propto \frac{E}{A}$$

A is maintained constant for medium to high $q$'s by the action of the supervisory loop. The action of maintaining A constant requires that E be inversely proportional to $q$.

$$E \propto \frac{1}{q}$$

Since the pitch or yaw loop gain tends to be proportional to $q$, the E control maintains pitch or yaw loop gain constant. As the missile goes into lower speed or less dense air making the control surfaces 11 through 14 less effective, the roll signal fed back by the conductor means 32 will decrease, tending to decrease the amplitude A of the signal waveform B, increasing the output voltage E to some maximum value where it stays fixed even though the missile still decreases in speed or flies in a less dense atmosphere, making the control surfaces less effective. Here, $$K \propto \frac{E}{A} \propto \frac{\text{constant}}{A} \propto \frac{1}{q}$$

showing that A varies and E is held constant. In this situation the passive adaptive control part of the system becomes effective and the error signals D for pitch and yaw will be effective to switch the on-off switches 19 through 22 to apply the fixed supply voltage torques to the actuators to produce vane angular control in accordance with the error signals D. As the error voltage D increases, the positive portion of waveform G increases applying a longer period of control voltage to the actuator.

In the supervisory loop 60 the voltage E is fed back to the multiplier 63 to multiply the supervisory loop error signal to maintain uniform supervisory loop operation. The limiter 65 restricts the $q$ range over which the supervisory loop is effective. The integrator 64 forces the error signal (output 62) to null by adjusting level E of the on-off switches 19 through 24 until limiter 65 saturates. While the circuit schematic block diagram in FIG. 1 is shown with the circuitry external of the missile 10, it is to be understood that this is circuitry within the missile and that the pitch command and yaw command signals may come by means of radio link in a manner well understood by those skilled in the art.

While many modifications and changes may be made in the constructional details and features of this invention to obtain the same results and spirit of this invention, We desire to be limited in the scope of our invention only the the limits of the appended claims.

We claim:

1. A nonlinear passive adaptive missile control system utilizing a supervisory loop with on-off switching elements to accomplish gain control by varying the on-off switching output levels comprising:
    a missile having control surfaces to maneuver same in roll, pitch, and yaw attitudes and having sensor means for sensing the roll, pitch, and yaw attitudes;
    an actuator means coupled to each control surface to drive same, two being pitch actuators and two being yaw actuators;
    an on-off switching means for each actuator having a supply voltage input, a control voltage input, and an output coupled, respectively, to each actuator for powering same;
    a roll channel, a pitch channel, and a yaw channel, each channel having one input, respectively, of roll reference voltage, pitch command voltage, and yaw command voltage and another input, respectively, of roll attitude sensor signal, pitch attitude signal, and yaw attitude signal coupled respectively to said roll, pitch, and yaw sensing means, and each channel with an output coupled to said switching means;
    a supervisory loop having an output coupled in common to all of said supply voltage inputs of said on-off switching means and having one input coupled to said roll channel output and another input of roll limit cycle amplitude reference voltage to compare the voltages of the two inputs to vary the output supply voltage whereby the supervisory loop controls the supply voltage amplitude to said actuators through said on-off switching means until it saturates after which a constant supply voltage is applied in accordance with the on-off switching means as controlled from said channels.

2. A nonlinear passive adaptive missile control system as set forth in claim 1 wherein:
    said channels each include a first summing network, a lead-lag network, and a second summing network with said pitch and yaw channels having an inverter between said lead-lag and second summing networks, said one and other inputs being to said first summing network, the outputs of said second summing networks being to said control input of said on-off switching means, the output from said pitch channel lead-lag network and from said inverter therein being to said second summing networks controlling the on-off switching circuits of the pitch actuators, and the output from said yaw channel lead-lag network and from said inverter therein being to said second summing networks controlling the on-off switching circuits of the yaw actuators to switch the respective on-off switching circuits to conduct supply voltage to the actuators whenever an error voltage exists between the inputs to said first summing network.

3. A nonlinear passive adaptive missile control system as set forth in claim 2 wherein:
    said supervisory loop includes a full wave rectifier, a third summing network, a multiplier, an integrating network, and a limiter, in that order, from said one input to said supply voltage output, said other input of said roll limit cycle amplitude reference voltage being the second input to said third summing network to vary the output supply voltage from a maximum limit to a minimum limit proportional to the integral of the sum of the inputs to said third summing network.

4. A nonlinear passive adaptive missile control system as set forth in claim 3 wherein:
    said actuators are one, two, three, and four from top to bottom, two and four being coupled to control surfaces for pitch control and one and three being coupled to control surfaces for yaw control whereby the pitch control surfaces and the yaw control surfaces will be actuated in unison in the same angular directions.

5. A nonlinear passive adaptive missile control system as set forth in claim 4 wherein
    said roll attitude sensor producing said sensor signal is a gyroscope in said missile.